United States Patent Office 3,406,176
Patented Oct. 15, 1968

3,406,176
7-HALO-4-CARBAMYLIMINO-1,4-DIHYDROQUINOLINES
Alexander R. Surrey, Albany, and Julian Richard Mayer, Colonie, N.Y., assignors to Sterling Drug Inc., New York, N.Y., a corporation of Delaware
No Drawing. Filed Aug. 24, 1964, Ser. No. 391,737
10 Claims. (Cl. 260—287)

ABSTRACT OF THE DISCLOSURE

7 - halo - 4 - imino - 1,4 - dihydroquinolines substituted by halophenyl-(lower-alkyl) at the 1-position and by N-R-carbamyl or N-R-thiocarbamyl at the 4-amino group where R is lower-alkyl, lower-carbalkoxy-(lower-alkyl)-phenyl or phenyl substituted by lower-alkyl, halo, nitro or lower-alkoxy are prepared by reacting the corresponding 1-(7-halo-4-quinolyl)-3-R-urea or -thiourea with a halophenyl-(lower-alkyl) ester of a strong acid and reacting the acid-addition salt of the resulting 1-[halophenyl-(lower-alkyl)]-4-(N-R-carbamyl- or -thiocarbamylimino)-1,4-dihydroquinoline with an acid-acceptor to yield said compound in free base form. The compounds have antibacterial and amebacidal activities.

---

This invention relates to compositions of matter of the class of 4-imino-1,4-dihydroquinolines.

The invention here resides in a composition of matter having a molecular structure in which a 7-halo-4-imino-1,4-dihydroquinoline is substituted by halophenyl-(lower-alkyl) at the 1-position and by N-R-carbamyl or N-R-thiocarbamyl at the 4-imino group where R is lower-alkyl, lower-carbalkoxy-(lower-alkyl), phenyl or phenyl substituted by lower-alkyl, halo, nitro or lower-alkoxy.

Among the compounds of our invention are those which in free base form are represented by Formula I

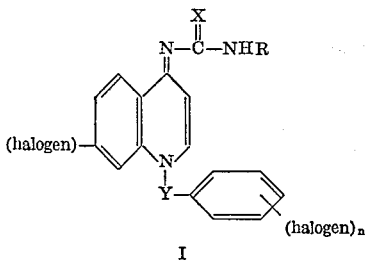

I where X is O or S, Y is lower-alkylene, $n$ is an integer from 1 to 3 inclusive, and R is lower-alkyl, lower-carbalkoxy-(lower-alkyl), phenyl or phenyl substituted by from one to three substituents selected from lower-alkyl, halo, nitro and lower-alkoxy.

The adjective "lower" where used herein, except in the term "lower-carbalkoxy," designates the modified term as having from one to six carbon atoms inclusive, e.g., "lower-alkyl" is illustrated by methyl, ethyl, n-propyl, isopropyl, isobutyl, n-butyl, 2-butyl, n-amyl, n-hexyl, and the like. In the one exception, i.e., "lower-carbalkoxy," the term has from two to seven carbon atoms. The terms "halogen" or "halo," as used herein, e.g., in Formula I, means chloro, bromo, iodo or fluoro.

Our compounds in the form of their acid-addition salts can be represented by Formula II

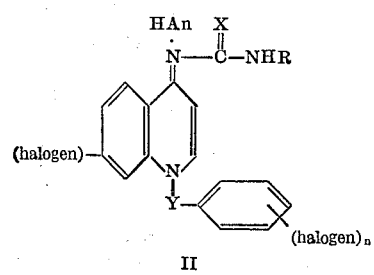

II where halogen, X, Y, R and $n$ have the meanings designated above and An is an anion.

The anion designated above as An can be any anion and is preferably a chemotherapeutically acceptable anion, for instance, chloride, bromide, iodide, sulfate, phosphate, sulfamate, benzenesulfonate, para-toluene-sulfonate, methanesulfonate, ethanesulfonate, citrate, tartrate, and the like; the anion has no appreciable activity of its own in the high dilutions at which the acid-addition salts as a whole are effective. In particular, the anion appears to contribute nothing to the chemotherapeutic properties which inhere to the cation portion of the substituted-1,4-dihydroquinolines of the present invention. However, preferred compounds are those in which An is halide, in particular, chloride, iodide or bromide, since these are derived from readily available starting materials. By a chemotherapeutically acceptable anion, we mean any anion which is innocuous to the animal organism in chemotherapeutic doses of the acid-addition salt, so that beneficial chemotherapeutic properties inherent in the cation are not vitiated by any possible side-effects ascribable to the anions; in other words, the latter do not substantially affect the chemotherapeutic properties inherent in the cations.

The acid-addition salts are prepared directly as described hereinafter or they are prepared from the free base either by dissolving the free base in an aqueous alkanol solution containing the appropriate acid and isolating the salt by evaporating the solution, or by reacting the free base and acid in an organic solvent, e.g., lower alkanol, in which case the salt separates directly or can be obtained by concentration of the solution. Alternatively, the acid-addition salts can be prepared by treating an acid-addition salt (Formula II) prepared directly as noted above with an anion-exchange resin saturated with the desired anion.

Although chemotherapeutically acceptable salts are preferred, all acid-addition salts are within the scope of our invention. All acid-addition salts are useful as sources of the free base form even if the particular salt per se is not desired as the final product, as for example when the salt is formed only for purposes of purification or identification, or when it is used as an intermediate in preparing a chemotherapeutically acceptable salt by ion exchange procedures.

Concerning the structure of the acid-addition salts represented above as Formula II, the following considerations are presented. From chemical and physical data it appears that structure II is actually a resonance hybrid whose main contributing structures are presented as follows by A↔B:

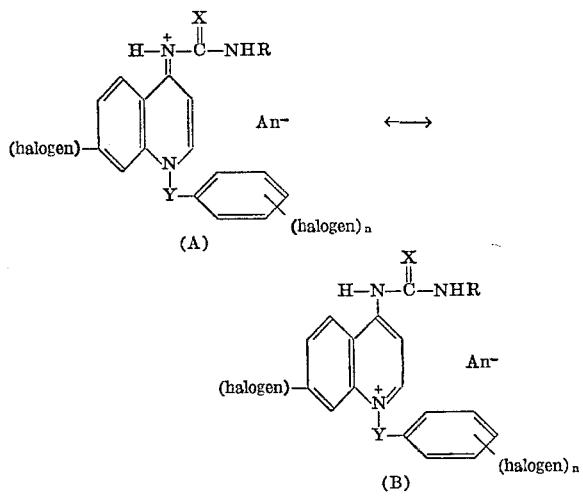

Since our compounds in free base form (Formula I) are readily obtained from their acid-addition salts by reaction with an acid-acceptor, as shown below, and since they are readily reconverted into their acid-addition salts by treatment with an acid, we prefer to represent the acid salt form by Formula II. As an illustration, we prefer to represent the hydrochloride salt of 7-chloro-1-(2-chlorobenzyl) - 4 - (N - n - butylcarbamyl)imino - 1,4-dihydroquinoline by the following structural Formula IIa.

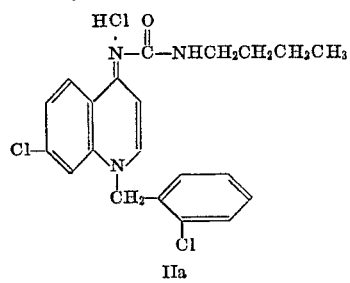

Alternatively, this compound can be named 7-chloro-1-(2 - chlorobenzyl) - 4 - (N-n-butylcarbamylamino)quinolinium chloride or 7-chloro-4-(N-n-butylcarbamylamino)quinoline-2-chlorobenzochloride and can be represented by the structural Formula IIb.

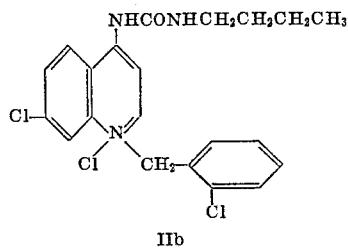

Thus, it is to be understood that although we prefer to represent the acid-addition salt form of our compounds by the structural formula designated above as II, i.e., as an acid-addition salt of a 1 - [halogenated - phenyl-(lower-alkyl)] - 4 - (N - R - carbamylimino)-1,4-dihydroquinoline, this 4-imino - 1,4 - dihydroquinoline structural activity represents only one of the contributing members of a resonance hybrid; and, further, it is to be understood that the salt form of our invention comprehends not only this 4-imino-1,4-dihydroquinoline structure, as specifically illustrated above as IIa, but also other contributing members of the resonance hybrid including the 1-[halogenated-phenyl-(lower-alkyl)] - 4 - (N-R-carbamylamino)quinolinium salt structure, as specifically illustrated above as IIb.

The compounds of Formulas I and II are prepared by methods generally known. For example, the compounds of Formula II are prepared by reacting the corresponding 1 - (7 - halo - 4 - quinolyl)-3-R-urea or -thiourea with a halophenyl-(lower-alkyl) ester of the formula (halogen)$_n$—C$_6$H$_4$—Y—An, where R, halo, halogen, $n$, Y and An have the meanings given hereinabove, and, the resulting compound of Formula II is reacted with an acid-acceptor to yield the product in free base form (Formula I). For example, the reaction of 1-(4-chlorophenyl)-3-(7-chloro-4-quinolyl)urea with 2,4-dichlorobenzyl chloride yields the hydrochloride of 7-chloro-4-[N-(4-chlorophenyl)carbamylimino] - 1 - (2,4-dichlorobenzyl)-1,4-dihydroquinoline which when treated with an acid-acceptor yields 7-chloro - 4 - [N-(4-chlorophenyl)carbamylimino]-1-(2,4-dichlorobenzyl)-1,4-dihydroquinoline.

These reactions are illustrated further by the specific examples hereinbelow.

The first step, i.e., the preparation of the acid-addition salt, takes place most readily with halo-phenyl-(lower-alkyl) esters of a strong inorganic acid or an organic sulfonic acid. The chloride, bromide or iodide is preferred because of the more ready availability of these halide esters. Compounds where the anion An is other than halogen or anions of strong acids can be prepared by reacting the free base form (Formula I) with appropriate acid by conventional means.

In the second step of reacting the acid-addition salt (II) with an acid-acceptor, the latter is a basic substance which preferably forms freely water-soluble byproducts easily separable from the product of the reaction, including, for example, sodium hydroxide, potassium hydroxide, sodium carbonate, potassium carbonate, sodium acetate, sodium alkoxides, potassium alkoxides, sodium amide, and the like.

The intermediate 1-(7-halo-4-quinolyl)-3-R-ureas and -thioureas are prepared by reacting the 7-halo-4-aminoquinoline with the appropriate cyanate (R—C=N=O) or thiocyanate (R—N=C=S).

The compounds of Formula I also are conveniently prepared by reacting the appropriate 7-halo-1-[halogenated-phenyl-(lower-alkyl)]-4-imino - 1,4 - dihydroquinoline with the appropriate isocyanate (R—N=C=O) or isothiocyanate (R—N=C=S). For example, 7-chloro-1-(2-chlorobenzyl) - 4 - (N-phenylthiocarbamylimino)-1,4-dihydroquinoline is obtained by reacting, preferably by heating, phenylisothiocyanate with 7-chloro-1-(2-chlorobenzyl)-4-imino-1,4-dihydroquinoline.

The intermediate 7-halo-1-[halogenated-phenyl-(loweralkyl)]-4-iminoquinolines are prepared by reacting the appropriate 4-imino-7-haloquinoline with the appropriate halogenated-phenyl-(lower-alkyl) halide, preferably chloride, as illustrated below in the specific exemplary disclosure.

Evaluation of our compounds of Formulas I and II by standard test procedures has shown that they have useful chemotherapeutic properties, in particular, antibacterial activity, and also amebacidal activity. When tested according to standard in vitro bacteriological evaluation procedures, they have been found to possess antibacterial activity, for example, against *Staphylococcus aureus, Eberthella typhi, Clostridium welchii* and *Mycobacterium tuberculosis*, at test concentration levels in the range of about 0.0015 to 0.10 mg./cc., as illustrated below in the examples. Some embodiments were found to have significant in vivo activity against *Klebsiella pneumonia* in Swiss mice when administered subcutaneously or orally at dose levels in the range of about 12.5 to 400 mg./kg./day and, also, to have amebacidal activity as determined by oral administration to hamsters infected with *Endamoeba criceti* at varying dose levels, e.g., 25 to 100 mg./kg./day.

The molecular structures of the compounds of our invention are established by their modes of synthesis and corroborated by the correspondence of calculated and found values for the elementary analyses and by infrared (IR) spectral analyses.

The following will further illustrate the invention without, however, limiting it thereto.

Example 1

The intermediate 7-halo-4-(N-R-carbamylamino)quinolines [same as 1-(7-halo-4-quinolyl)-3-R-ureas] were prepared as illustrated below.

(A) 7 - chloro-4-[N-(4-methoxyphenyl)carbamylamino]quinoline.—A mixture containing 5.0 g. of 4-amino-7-chloroquinoline, 4.1 g. of 4-methoxyphenyl isocyanate and 50 ml. of benzene was heated on a steam bath for thirty minutes and cooled. The resulting solid was collected, recrystallized from ethanol-water, and dried overnight at 100° C. to yield 7.5 g. of 7-chloro-4-[N-(4-methoxyphenyl) - carbamylamino]quinoline, M.P. 189.0–190.4° C. (corr.).

(B) 7 - chloro - 4-[N-(4-chlorophenyl)carbamylamino]quinoline was prepared following the procedure of Example 1A using 7.1 g. of 4-amino-7-chloroquinoline, 6.1 g. of 4-chlorophenyl isocyanate, 100 ml. of benzene and a heating period of ninety minutes. There was thus obtained 8.2 g. of the product, M.P. 206.2–219.2° C. (corr.), after recrystallizing from isopropyl alcohol and drying at 60° C. for eighteen hours at 20 mm.

(C) 7 - chloro - 4-(N-phenylcarbamylamino)quinoline was prepared following the procedure described in Example 1A using 7.1 g. of 4-amino-7-chloroquinoline, 4.8 g. of phenyl isocyanate, 100 ml. of benzene and a reflux period of ninety minutes. There was obtained 8.2 g. of the product, M.P. 188.4–189.4° C. (corr.), after recrystallization from isopropyl alcohol using decolorizing charcoal and drying for four days at 90° C.

(D) 4 - (N - n-butylcarbamylamino)-7-chloroquinoline was prepared as in Example 1A using 17.9 g. of 4-amino-7-chloroquinoline, 9.9 g. of n-butyl isocyanate, 225 ml. of benzene and a reflux period of three hours. There was obtained 14.9 g. of the product, M.P. 173.4–174.8° C. (corr.), when recrystallized twice from ethyl acetate and dried for eighteen hours at 75° C.

(E) 4 - [N - (carbethoxymethyl)carbamylamino]-7-chloroquinoline was prepared as in Example 1A using 7.1 g. of 4-amino-7-chloroquinoline, 5.7 g. of carbethoxymethyl isocyanate, 100 ml. of benzene and a reflux period of two and one half hours. After two recrystallizations from isopropyl alcohol using decolorizing charcoal, the product was dissolved in hot isopropyl alcohol, the solution treated with decolorizing charcoal and filtered, and the filtrate treated with an excess of hydrogen chloride in ethanol to yield 1.5 g. of 4-[N- carbethoxymethyl)carbamylamino] - 7 - chloroquinoline hydrochloride, M.P. 230.0–232.0° C. (corr.), with decomposition, after drying at 50° C. for eighteen hours at 20 mm.

Following the procedure described in Example 1A using corresponding molecular equivalent quantiies of the appropriate 4-amino-7-haloquinoline and isocyanate or isothiocyanate, the following compounds are prepared.

(F) 4- - [N - (2-carbomethoxyethyl)carbamylamino]-7-iodoquinoline, using 4-amino-7-iodoquinoline and 2-carbomethoxyethyl isocyanate.

(G) 4 - [N - (4-carbo-n-butoxybutyl)carbamylamino]-7-chloroquinoline, using 4-amino-7-chloroquinoline and 4-carbo-n-butoxybutyl isocyanate.

(H) 7 - chloro - 4-(N-phenylthiocarbamylamino)quinoline, using 4-amino-7-chloroquinoline and phenyl isothiocyanate.

(I) 7 - chloro-4-[N-(4-chlorophenyl)thiocarbamylamino]quinoline, using 4-amino-7-chloroquinoline and 4-chlorophenyl isothiocyanate

Example 2

4 - N - n-butylcarbamylimino-7-chloro-1-(2-chlorobenzyl)-1,4-dihydroquinoline in the form of its hydrochloride salt was prepared as follows: A mixture containing 6.4 g. of 4-N-n-butylcarbamylamino-7-chloroquinoline, 7.5 g. of 2-chlorobenzyl chloride and 100 ml. of acetonitrile was refluxed for eight hours, and then allowed to stand at room temperature. The solid that separated was collected, triturated in hot ethanol, collected, and dried for two days at 90° C. to yield 3.3 g. of the product, 4-N-n-butylcarbamylimino - 7 - chloro-1-(2-chlorobenzyl)-1,4-dihydroquinoline hydrochloride, M.P. 293.2–294.6° C. (corr.).

4 - N - n - butylcarbamylimino-7-chloro-1-(2-chlorobenzyl)-1,4-dihydroquinoline hydrochloride was found to have in vivo activity against *Klebsiella pneumonia* in Swiss mice when administered subcutaneously at dose levels of 12.5 mg./kg./day (3 out of 10 mice survived), 25m g./kg./day (9 out of 10 mice survived), 100 mg./kg./day (14 out of 20 mice survived), and 200 mg./kg./day (7 out of 10 mice survived).

Example 3

The preparation of the intermediate 7-halo-4-iminoquinolines and their acid-addition salts is illustrated in the following paragraphs.

(A) 7 - chloro - 1-(2-chlorobenzyl)-4-imino-1,4-dihydroquinoline in free base form was prepared as follows: A mixture containing 16 g. of 4-amino-7-chloroquinoline, 16.1 g. of 2-chlorobenzyl chloride and 100 ml. of acetonitrile was refluxed with stirring on a steam bath for about four hours and then allowed to cool to room temperature. The resulting solid was collected and dissoved in a hot mixture of ethanol and water; the solution cooled to turbidity; excess 35% aqueous sodium hydroxide solution added; and the mixture cooled. The precipitate was collected and dried to yield 17.5 g. of 7-chloro-1-(2-chlorobenzyl)-4-imino-1,4-dihydroquinoline, M.P. 155–158° C.

(B) 7 - chloro - 1-(2-chlorobenzyl)-4-imino-1,4-dihydroquinoline in the form of its hydrochloride was prepared as follows: A mixture containing 7.5 g. of 4-amino-7-chloroquinoline, 7.5 g. of 2-chlorobenzyl chloride and 50 ml. of acetonitrile was refluxed for twenty-two hours and the reaction mixture was then placed in a refrigerator. The resulting precipitate was collected and recrystallized from ethanol to yield 11 g. of 7-chloro-1-(2-chlorobenzyl) - 4 - imino-1,4-dihydroquinoline hydrochloride, M.P. >300° C. (corr.).

Following the procedure described in Example 3A using corresponding molecular equivalent quantities of the appropriate 4-amino-7-haloquinoline and halogenated-phenyl-(lower-alkyl) chloride, the following compounds are prepared.

(C) 7 - bromo - 1-(2-bromobenzyl)-4-imino-1,4-dihydroquinoline, using 4-amino-7-bromoquinoline and 2-bromobenzyl chloride.

(D) 4 - imino - 7 - iodo-1-(4-iodobenzyl)-1,4-dihydroquinoline, using 4-amino-7-iodoquinoline and 4-iodobenzyl chloride.

(E) 7 - fluoro-4-imino-1-(2,4,6-trichlorobenzyl)-1,4-dihydroquinoline, using 4 - amino - 7-fluoroquinoline and 2,4,6-trichlorobenzyl chloride.

(F) 7 - chloro - 1-[2-(4-chlorophenyl)ethyl]-4-imino-1,4 - dihydroquinoline, using 4-amino-7-chloroquinoline and 2-(4-chlorophenyl)ethyl chloride.

(G) 7 - chloro - 1-[4-(2,4-dibromophenyl)butyl]-4-imino-1,4-dihydroquinoline, using 4-amino-7-chloroquinoline and 4-(2,4-dibromophenyl)butyl chloride.

(H) 7 - chloro-1-(2-fluorobenzyl)-4-imino-1,4-dihydroquinoline, using 4-amino-7-chloroquinoline and 2-fluorobenzyl chloride.

(I) 7-chloro - 1-[2-(2-chlorophenyl)propyl]-4-imino-1,4-dihydroquinoline, using 4-amino-7-chloroquinoline and 2-(2-chlorophenyl)propyl chloride.

(J) 7 - chloro-1-(4-chlorobenzyl)-4-imino-1,4-dihydroquinoline, using 4-amino-7-chloroquinoline and 4-chlorobenzyl chloride.

(K) 7 - chloro-1-(2,4-dichlorobenzyl)-4-imino-1,4,-dihydroquinoline, using 4-amino-7-chloroquinoline and 2,4-dichlorobenzyl chloride.

(L) 7-chloro-1-(3-chlorobenzyl)-4-imino-1,4-dihydroquinoline, using 4-amino-7-chloroquinoline and 3-chlorobenzyl chloride.

Example 4

4 - (N - n-butylcarbamylimino)-7-chloro-1-(2-chlorobenzyl)-1,4-dihydroquinoline.—A mixture containing 3 g. of 7-chloro-1-(2-chlorobenzyl)-4-imino-1,4-dihydroquinoline, 1 g. of n-butyl isocyanate and 50 ml. of benzene was refluxed for about sixteen hours, filtered, and the filtrate allowed to stand at room temperature. The precipitate was collected and recrystallized from benzene to yield 2.2 g. of 4-(N-n-butylcarbamylimino)-7-chloro-1-(2 - chlorobenzyl) - 1,4-dihydroquinoline, M.P. 141.2–142.6° C. (corr.).

When tested according to standard in vitro bacteriological evaluation procedures, 4-(N-n-butylcarbamylimino)-7 - chloro - 1-(2-chlorobenzyl)-1,4-dihydroquinoline was found to have bacteriostatic activity against *Staphylococcus aureus, Eberthella typhi, clostridium welchii* and *Mycobacterium tuberculosis* at respective concentrations of 0.25, 0.25, 0.25 and 0.05 mg./cc., and to have bactericidal activity against the same four organisms at respective concentrations of 0.25, 0.5, 0.25 and 0.05 mg./cc. This compound was found to have in vivo activity against *Klebsiella pneumonia* in Swiss mice when administered subcutaneously at dose levels of 200 mg./kg./day (18 out of 20 mice survived) and 400 mg./kg./day (9 out of 10 mice survived).

Example 5

4 - (N-n-butylthiocarbamylimino)-7-chloro-1-(2-chlorobenzyl)-1,4-dihydroquinoline.—A mixture containing 3 g. of 7-chloro-1-(2-chlorobenzyl)-4-imino-1,4-dihydroquinoline, 1.15 g. of n-butyl isothiocyanate and 50 ml. of benzene was refluxed for about sixteen hours, and the hot reaction mixture filtered. The hot filtrate was brought to turbidity by addition of hot n-hexane and placed in a refrigerator overnight. To the cold solution was added n-pentane and the solid that separated was collected and recrystallized from isopropyl alcohol to yield 4-(N-n-butylthiocarbamylimino) - 7 - chloro-1-(2-chlorobenzyl)-1,4-dihydroquinoline, M.P. 174.4–176.0° C. (corr.).

4-(N-n-butylthiocarbamylimino)-7-chloro-1-(2-chlorobenzyl)-1,4-dihydroquinoline was found to have bacteriostatic activity against *Eberthella typhi, Clostridium welchii* and *Mycobacterium tuberculosis* at respective concentrations of 0.2, 0.0015, and 0.0015 mg./cc., and to have bactericidal activity against the same three organisms at respective concentrations of 0.2, 0.01 and 0.0015 mg./cc.

Example 6

7 - chloro - 1 - (2-chlorobenzyl)-4-(N-phenylthiocarbamylimino)-1,4-dihydroquinoline.—A mixture containing 3 g. of 7-chloro-1-(2-chlorobenzyl)-4-imino-1,4-dihydroquinoline, 1.35 g. of phenyl isothiocyanate and 50 ml. of benzene was refluxed for about sixteen hours and allowed to cool to room temperature. The separated solid was collected, triturated first with hot ethanol, and then with isopropyl alcohol to yield 4.7 g. of 7-chloro-1-(2-chlorobenzyl) - 4 - (N-phenylthiocarbamylimino)-1,4-dihydroquinoline, M.P. 172.2–173.8° C. (corr.).

Example 7

7 - chloro - 1-(2-chlorobenzyl)-4-(N-phenylcarbamylimino)-1,4-dihydroquinoline.—A cool solution of 3. g. of 7 - chloro-1-(2-chlorobenzyl)-4-imino-1,4-dihydroquinoline in about 75 ml. of benzene was treated with a solution of 1.2 g. of phenyl isocyanate in about 25 ml. of benzene and the mixture allowed to stand at room temperature for about sixteen hours. The resulting precipitate was collected to yield 3.0 g. of 7-chloro-1-(2-chlorobenzyl) - 4-(N-phenylcarbamylimino)-1,4-dihydroquinoline, M.P. 172.4–173.8° C. (corr.).

7 - chloro - 1-(2-chlorobenzyl)-4-(N-phenylcarbamylimino)-1,4-dihydroquinoline was found to have bacteriostatic activity against *Staphylococcus aureus, Eberthella typhi* and *Clostridium welchii* at respective concentrations of 0.025, 0.076 and 0.05 mg./cc., and to have bactericidal activity against the same three organisms at respective concentrations of 0.1, 0.1 and 0.05 mg./cc.

Example 8

7 - chloro - 1-(2-chlorobenzyl)4-[N-(4-chlorophenyl)-carbamylimino]-1,4-dihydroquinoline.—To a stirred solution containing 3 g. of 7-chloro-1-(2-chlorobenzyl)-4-imino-1,4-dihydroquinoline in 100 ml. of warm ethanol was added rapidly 1.7 g. of 4-chlorophenyl isocyanate. The reaction mixture was stirred for a few minutes and filtered to yield 4.3 g. of 7-chloro-1-(2-chlorobenzyl)-4-[N - (4-chlorophenyl)carbamylimino]-1,4-dihydroquinoline, M.P. 190.6–191.8° C. (corr.).

7 - chloro - 1-(2-chlorobenzyl)-4-[N-4-chlorophenyl) carbamylimino]-1,4-dihydroquinoline was found to have bacteriostatic activity against *Staphylococcus aureus* and *Eberthella typhi* at respective concentration of 0.05 and 0.25 mg./cc., and to have bactericidal activity against the same two organisms at respective concentrations of 0.1 and 0.5 mg./cc.

Example 9

7 - chloro - 1 - (2 - chlorobenzyl)-4-[N-(4-methoxyphenyl)carbamylimino] - 1,4 - dihydroquinoline was prepared following the procedure described in Example 8 using 3 g. of 7-chloro-1-(2-chlorobenzyl)-4-imino-1,4-dihydroquinoline, 1.7 g. of 4-methoxyphenyl isocyanate and 75 ml. of ethanol. There was thus obtained 4.3 g. of the product, M.P. 196.0–196.8° C. (corr.).

7-chloro-1-(2-chlorobenzyl) - 4 - [N-(4-methoxy-phenyl)carbamylimino]-1,4-dihydroquinoline was found to have bacteriostatic activity against *Staphylococcus aureus, Eberthella typhi* and *Clostridium welchii* at respective concentrations of 0.076, 0.1 and 0.1 mg./cc. This compound was also found to have in vivo activity against *Klebsiella pneumonia* in Swiss mice when administered orally at a dose level of 200 mg./kg./day (6 out of 10 mice survived).

Example 10

7-chloro - 1 - (2 - chlorobenzyl)-4-[N-(4-nitrophenyl) carbamylimino]-1,4-dihydroquinoline.—To a stirred solution containing 3 g. of 7-chloro-1-(2-chlorobenzyl)-4-imino-1,4-dihydroquinoline in 75 ml. of benzene was added a solution of 1.8 g. of 4-nitrophenyl isocyanate in about 25 ml. of benzene. The crystalline product (4.4 g.), M.P. 229.2–231.4° C. (corr.), that separated was collected.

7-chloro-1-(2-chlorobenzyl) - 4 - [N - (4-nitrophenyl) carbamylimino]-1,4-dihydroquinoline was found to have bacteriostatic activity against *Staphylococcus aureus, Eberthella typhi* and *Clostridium welchii* at respective concentrations of 0.05, 0.25 and 0.25 mg./cc., and to have bactericidal activity against the same three organisms at respective concentrations of 0.076, 0.25 and 0.25 mg./cc. This compound was also found to have in vivo activity against *Klebsiella pneumonia* in Swiss mice when administered subcutaneously at a dose level of 200 mg./kg./day (10 out of 20 mice survived).

Example 11

7-chloro-1-(2-chlorobenzyl)-4-[N-(2 - methoxyphenyl) carbamylimino] - 1,4 - dihydroquinoline.—To a solution containing 3.0 g. of 7-chloro-1-(2-chlorobenzyl)-4-imino-1,4-dihydroquinoline in 75 ml. of ethanol was added with stirring at room temperature 1.7 g. of 2-methoxyphenyl isocyanate. The reaction mixture was chilled and the precipitate collected and recrystallized from benzene-n-hexane to yield 3.0 g. of the product, M.P. 209.8–210.4° C. (corr.).

7-chloro-1-(2 - chlorobenzyl)-4-[N-(2-methoxyphenyl) carbamylimino]-1,4-dihydroquinoline when administered orally to hamsters infected with *Endamoeba criceti* was found to clear 2 out of 4, 5 out of 5, and 5 out of 5 of the animals at dose levels of 25, 50 and 100 mg./kg./day, respectively.

Example 12

4-[N-(carbethoxymethyl)carbamylimino] - 7 - chloro-1-(2-chlorobenzyl) - 1,4 - dihydroquinoline.—A mixture containing 6.7 g. of 4-[N-(carbethoxymethyl)carbamylamino]-7-chloroquinoline, 14.2 g. of 2-chlorobenzyl chloride and 100 ml. of acetonitrile was refluxed for twenty-two hours and then cooled. The solid that separated was collected, boiled in isopropyl alcohol, and recrystallized once from methanol-water and once from ethanol-water to yield 3.4 g. of the product in the form of its hydrochloride, M.P. 238.0–240.2° C. (corr.), with decomposition. A portion of the hydrochloride was converted into the free base form which was recrystallized from isopropyl alcohol to yield 4-[N-(carbethoxymethyl)carbamylimino]-7-chloro-1-(2 - chlorobenzyl)-1,4-dihydroquinoline, M.P. 135–137° C.

Following the procedures described in Examples 4–12, as indicated, and using corresponding molar equivalent quantities of the appropriate reactants, the compounds of Examples 13–28 are prepared.

Example 13

7-bromo-1-(2-bromobenzyl) - 4 - (N-n-hexylcarbamylimino)-1,4-dihydroquinoline, like Example 4 using 7-bromo-1 - (2 - bromobenzyl)-4-imino-1,4-dihydroquinolone and n-hexyl isocyanate.

Example 14

7-iodo-1-(4-iodobenzyl) - 4 - (N-n-propylcarbamylimino)-1,4-dihydroquinoline, like Example 4 using 7-iodo-1-(4-iodobenzyl)-4-imino-1,4-dihydroquinoline and n-propyl isocyanate.

Example 15

7-fluoro-4-(N - methylcarbamylimino) - 1 - (2,4,6-trichlorobenzyl)-1,4-dihydroquinoline, like Example 4 using 7-fluoro-4-imino-1-(2,4,6-trichlorobenzyl) - 1,4 - dihydroquinoline and methyl isocyanate.

Example 16

7-chloro - 1 - [2-(4-chlorophenyl)ethyl]-4-(N-isobutylthiocarbamylimino)-1,4-dihydroquinoline, like Example 5 using 7-chloro-1-[2-(4-chlorophenyl)ethyl]-4-imino-1,4-dihydroquinoline and isobutyl isothiocyanate.

Example 17

7-chloro-1-[4-(2,4 - dibromophenyl)butyl]-4-(N-ethylthiocarbamylimino)-1,4-dihydroquinoline, like Example 5 using 7-chloro-1-[4-(2,4-dibromophenyl)butyl]-4-imino-1,4-dihydroquinoline and ethyl isothiocyanate.

Example 18

4-[N - (2 - carbomethoxyethyl)carbamylimino]-7-iodo-1-(2,4-diiodobenzyl)-1,4-dihydroquinoline, like Example 12 using 4-[N-(2-carbomethoxyethyl)carbamylamino]-7-iodoquinoline and 2,4-diiodobenzyl chloride.

Example 19

4 - [N - (4 - carbo - n - butoxybutyl)carbamylimino]-7-chloro-1-(2-chlorobenzyl)-1,4-dihydroquinoline, like Example 12 using 4-[N-(4-carbo-n-butoxybutyl)carbamylamino]-7-chloroquinoline and 2-chlorobenzyl chloride.

Example 20

7-chloro-4-(N - 2,4 - dichlorophenylthiocarbamylimino)-1-(2-fluorobenzyl)-1,4-dihydroquinoline, like Example 6 using 7-chloro-1-(2-fluorobenzyl)-4-imino-1,4-dihydroquinoline and 2,4-dichlorophenyl isothiocyanate.

Example 21

7-chloro-1-[2-(2-chlorophenyl)propyl] - 4 - [N-(2,4,6-tribromophenyl)carbamylimino] - 1,4 - dihydroquinoline, like Example 8 using 7-chloro-1-[2-(2-chlorophenyl)propyl]-4-imino - 1,4 - dihydroquinoline and 2,4,6-tribromophenyl isocyanate.

Example 22

7-chloro-1-(4-chlorobenzyl) - 4 - [N - (4-chloro-2-methoxyphenyl)carbamylimino] -,4 - dihydroquinoline, like Example 8 using 7-chloro-1-(4-chlorobenzyl)-4-imino-1,4-dihydroquinoline and 4-chloro-2-methoxyphenyl isocyanate.

Example 23

7-chloro-1-(2,4 - dichlorobenzyl)-4-[N-(2,4-dimethoxyphenyl)carbamylimino]-1,4-dihydroquinoline, like Example 8 using 7-chloro-1-(2,4-dichlorobenzyl-4-imino-,4-dihydroquinoline and 2,4-dimethoxyphenyl isocyanate.

Example 24

4-[N-(4-n - butoxyphenyl)carbamylimino] - 7 - chloro-1-(2,4-dichlorobenzyl)-1,4-dihydroquinoline, like Example 8 using 7-chloro-1-(2,4-dichlorobenzyl)-4-imino-1,4-dihydroquinoline and 4-n-butoxylphenyl isocyanate.

Example 25

7 - chloro - 1 - (3 - chlorobenzyl) - 4 - [N - (3-nitrophenyl) - thiocarbamylimino] - 1,4 - dihydroquinoline, like Example 10 using 7-chloro-1-(3-chlorobenzyl)-4-imino-1,4-dihydroquinoline and 3-nitrophenyl isothiocyanate.

Example 26

7 - chloro - 1 - (2 - chlorobenzyl) - 4 - [N - (4 - iodophenyl) - carbamylimino] - 1,4 - dihydroquinoline, like Example 8 using 7-chloro-1-(2-chlorobenzyl)-4-imino-1,4-dihydroquinoline and 4-iodophenyl isocyanate.

Example 27

7 - chloro - 1 - (4 - chlorobenzyl) - 4 - [N - (4 - fluorophenyl)carbamylimino] - 1,4 - dihydroquinoline, like Example 8 using 7-chloro-1-(4-chlorobenzyl-4-imino-1,4-dihydroquinoline and 4-fluorophenyl isocyanate.

Example 28

7 - chloro - 1 - [6 - (2 - chlorophenyl)hexyl] - 4 - [N-(4 - methylphenyl)carbamylimino] - 1,4 - dihydroquinoline, like Example 7 using 7-chloro-1-[6-(2-chlorophenyl)hexyl]-4-imino-1,4-dihydroquinoline and 4-methylphenyl isocyanate.

We claim:
1. A compound of the formula

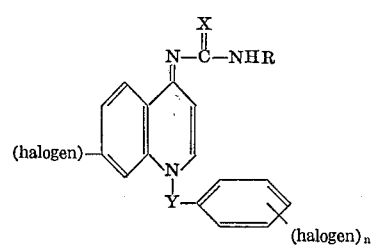

where X is a member selected from the group consisting of O and S, Y is lower-alkylene, $n$ is an integer from one to three inclusive, and R is a member selected from the group consisting of lower-alkyl, lower-carbalkoxy-(lower-alkyl), phenyl and phenyl substituted by from one to three substituents selected from the group consisting of lower-alkyl, halo, nitro, and lower-alkoxy.

2. 4-(N-n-butylcarbamylimino)-7-chloro-1-(2-chlorobenzyl)-1,4-dihydroquinoline.

3. 4-(N-n-butylthiocarbamylimino)-7-chloro-1-(2-chlorobenzyl)-1,4-dihydroquinoline.
4. 7-chloro-1-(2-chlorobenzyl)-4-(N-phenylthiocarbamylimino)-1,4-dihydroquinoline.
5. 7-chloro-1-(2-chlorobenzyl)-4-(N-phenylcarbamylimino)-1,4-dihydroquinoline.
6. 7-chloro-1-(2-chlorobenzyl)-4-[N-(4-chlorophenyl)carbamylimino]-1,4-dihydroquinoline.
7. 7-chloro-1-(2-chlorobenzyl)-4-[N-(4-methoxyphenyl)carbamylimino]-1,4-dihydroquinoline.
8. 7-chloro-1-(2-chlorobenzyl)-4-[N-(4-nitrophenyl)carbamylimino]-1,4-dihydroquinoline.
9. 7-chloro-1-(2-chlorobenzyl)-4-[N-(2-methoxyphenyl)carbamylimino]-1,4-dihydroquinoline.
10. 4-[N-(carbethoxymethyl)carbamylimino]-7-chloro-1-(-chlorobenzyl)-1,4-dihydroquinoline.

References Cited
UNITED STATES PATENTS

| | | | |
|---|---|---|---|
| 2,086,822 | 7/1937 | Schubert | 260—288 X |
| 3,075,981 | 1/1963 | Surrey et al. | 260—289 X |
| 3,075,984 | 1/1963 | Surrey et al. | 260—288 |
| 3,275,628 | 9/1966 | Brown | 260—247.5 |

FOREIGN PATENTS 1,157,626  11/1963  Germany.

OTHER REFERENCES

May et al. J. Org. Chem. vol. 12, pp. 869–7 (1947).

NICHOLAS S. RIZZO, *Primary Examiner.*
DONALD G. DAUS, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,406,177                     October 15, 1968

Clayton W. Yoho

It is certified that error appears in the above identified patent and that said Letters Patent are hereby corrected as shown below:

In the title, throughout the specification, and in the claims, "meta" should be italicized. Column 1, line 50, "discused should read -- discussed --. Column 2, lines 17 and 18, "N-(meta-toluyl)-ethylpiperidine" should read -- N-(meta-toluyl)-2-ethylpiperidine --. Columns 5 and 6, TABLE III, fifth column, line 2 thereof, insert -- NR --.

Signed and sealed this 17th day of March 1970.

(SEAL)
Attest:

Edward M. Fletcher, Jr.            WILLIAM E. SCHUYLER, JR.
Attesting Officer                      Commissioner of Patents